(12) United States Patent
Schaefer et al.

(10) Patent No.: US 12,545,361 B2
(45) Date of Patent: Feb. 10, 2026

(54) REINFORCING DEVICE FOR REINFORCING A BICYCLE FRAME, AND BICYCLE FRAME HAVING REINFORCING DEVICE

(71) Applicant: SRAM, LLC, Chicago, IL (US)

(72) Inventors: Jonni Schaefer, Hannover (DE); Christian Wurmbaeck, Jesberg (DE)

(73) Assignee: SRAM, LLC, Chicago, IL (US)

( * ) Notice: Subject to any disclaimer, the term of this patent is extended or adjusted under 35 U.S.C. 154(b) by 632 days.

(21) Appl. No.: 17/918,908

(22) PCT Filed: Apr. 15, 2021

(86) PCT No.: PCT/EP2021/059835
§ 371 (c)(1),
(2) Date: Oct. 14, 2022

(87) PCT Pub. No.: WO2021/209572
PCT Pub. Date: Oct. 21, 2021

(65) Prior Publication Data
US 2023/0234663 A1    Jul. 27, 2023

(30) Foreign Application Priority Data
Apr. 17, 2020   (DE) .................... 20 2020 102 128.1

(51) Int. Cl.
*B62M 6/90*    (2010.01)
*B62J 43/28*   (2020.01)
(Continued)

(52) U.S. Cl.
CPC ............. *B62M 6/90* (2013.01); *B62J 43/28* (2020.02); *B62K 3/02* (2013.01); *B62K 19/00* (2013.01)

(58) Field of Classification Search
CPC . B62M 6/90; B62M 6/55; B62J 43/28; B62K 3/04; B62K 3/06; B62K 3/08;
(Continued)

(56) References Cited

U.S. PATENT DOCUMENTS 7,393,125 B1    7/2008   Li
8,979,110 B2 *  3/2015   Talavasek ................ B62M 6/60
                                                280/279

(Continued)

FOREIGN PATENT DOCUMENTS

CN    206856919 U  *  1/2018
CN    109319035 A     2/2019
(Continued)

*Primary Examiner* — Alentin Neacsu
*Assistant Examiner* — Morgan Knauf
(74) *Attorney, Agent, or Firm* — Norman B. Thot (57) ABSTRACT

A reinforcement device for reinforcing an electric bicycle frame at least in a region of a tube cutout of a bicycle frame tube which accommodates an energy storage. The reinforcement device includes a first reinforcement element which extends axially in the bicycle frame tube and/or extends at a certain angle to the bicycle frame tube, and at least one second reinforcement element which extends axially in the bicycle frame tube. The reinforcement device is installed in the bicycle frame tube.

10 Claims, 5 Drawing Sheets

(51) Int. Cl.
*B62K 3/02* (2006.01)
*B62K 19/00* (2006.01)

(58) Field of Classification Search
CPC . B62K 3/10; B62K 3/02; B62K 19/00; B62K 19/30
USPC ..................................................... 280/281.1
See application file for complete search history.

(56) References Cited

U.S. PATENT DOCUMENTS

| | | | |
|---|---|---|---|
| 9,302,735 B2 * | 4/2016 | Tagaya | B62M 6/90 |
| 9,745,019 B2 * | 8/2017 | Evensen | B62K 19/40 |
| 2021/0016850 A1 * | 1/2021 | Bass | B62M 6/70 |

FOREIGN PATENT DOCUMENTS

| | | | | |
|---|---|---|---|---|
| CN | 110690385 A | 1/2020 | | |
| DE | 20 2007 006 211 U1 | 8/2007 | | |
| DE | 10 2013 108 313 A1 | 7/2014 | | |
| DE | 10 2017 200 829 A1 | 7/2018 | | |
| EP | 2998213 A1 * | 3/2016 | | B62M 6/90 |
| EP | 3 653 481 A1 | 5/2020 | | |
| WO | WO-2018134006 A1 * | 7/2018 | | B62K 19/02 |
| WO | WO-2019167732 A1 * | 9/2019 | | B62J 43/13 |

\* cited by examiner

Fig. 11

REINFORCING DEVICE FOR REINFORCING A BICYCLE FRAME, AND BICYCLE FRAME HAVING REINFORCING DEVICE

CROSS REFERENCE TO PRIOR APPLICATIONS

This application is a U.S. National Phase application under 35 U.S.C. § 371 of International Application No. PCT/EP2021/059835, filed on Apr. 15, 2021 and which claims benefit to German Patent Application No. 20 2020 102 128.1, filed on Apr. 17, 2020. The International Application was published in German on Oct. 21, 2021 as WO 2021/209572 A1 under PCT Article 21(2).

FIELD

The present invention relates to a reinforcement device for reinforcing an electric bicycle frame in the region of a cutout accommodating an energy storage device and to a bicycle frame with such a reinforcement device.

BACKGROUND

In electric bicycles, the electric energy storage device is increasingly being integrated into a bicycle frame tube instead of being mounted on a frame tube, as has previously been customary. The associated visual advantage is offset by increased manufacturing and associated costs as well as special requirements with regard to sufficient tube stiffness in this area. The increased effort with regard to sufficient frame rigidity results from the fact that, in order to integrate the supply unit into the frame tube, an area of the frame tube must be provided with a structurally weakening cut-out that defines an opening through which the electric energy storage unit can be removed from the frame tube or reinserted into the frame tube, for example, for charging.

DE 10 2017 200 829 A1 describes providing the bicycle frame tube at least in the area of the opening cut-out with individual reinforcing ribs, reinforcing webs, and the like to produce the required frame stiffness, which are welded to the relevant tube wall, for example, by material bonding. This results in considerable manufacturing costs. The increased manufacturing costs also result, among other things, from poor accessibility of the installation space within the frame tube so that the manufacturing steps must be carried out in a complicated and time-consuming manner.

SUMMARY

An aspect of the present invention is to provide a simplified and inexpensive method to reinforce a bicycle frame tube and a bicycle frame reinforced thereby.

In an embodiment, the present invention provides a reinforcement device for reinforcing an electric bicycle frame at least in a region of a tube cutout of a bicycle frame tube which is configured to accommodate an energy storage. The reinforcement device includes a first reinforcement element which is configured to at least one of extend axially in the bicycle frame tube and to extend at a certain angle to the bicycle frame tube, and at least one second reinforcement element which is configured to extend axially in the bicycle frame tube. The reinforcement device is configured to be installed in the bicycle frame tube.

BRIEF DESCRIPTION OF THE DRAWINGS

The present invention is described in greater detail below on the basis of embodiments and of the drawings in which.

DETAILED DESCRIPTION

The reinforcement device according to the present invention is an independently pre-produced modular component which can be installed in a tube of a bicycle frame. The reinforcement device comprises a first linear reinforcement element extending axially in the tube and/or, at a certain angle thereto, at least one second linear reinforcement element also extending axially in the tube. The reinforcement device according to the present invention is manufactured separately from the bicycle frame and can subsequently be mounted in various frame shapes. Due to the angular arrangement of the first and second reinforcement elements, a sufficient stiffening of the reinforcement device and thus of the bicycle frame can be provided at least in the region of an opening cut-out provided in the bicycle frame tube for mounting an energy storage device. The reinforcement device may have the length of the cut-out or be longer than the cut-out. The length of the reinforcement device may also correspond to the length of the entire relevant bicycle frame tube.

In the present case, a first or second reinforcement element is to be understood as a more or less flat or web-like element which is, however, not basically flat but which may also be slightly curved and/or configured with a wedge-shaped cross-section. The first and the second reinforcement element are at an angle of at least 45° to each other enclosed by both, so that the geometrical moment of inertia of the reinforcement element with respect to longitudinal bending, transverse bending and/or torsion is thereby high, in particular in the state installed in the bicycle frame tube and in interaction with the bicycle frame tube. The second reinforcement element can, for example, protrude from the first reinforcement element by at least 5 mm, for example, by at least 8 mm.

The entire reinforcement device can, for example, be made of a suitable metal and be provided completely in one piece, i.e., also free of welds.

In the present case, the axial direction is always understood to be the longitudinal direction of the bicycle frame tube concerned when the reinforcement device is installed in the bicycle frame tube. The reinforcement device is configured to be linearly elongated in the axial direction.

The first reinforcement element, for example, the base plate of the elongated reinforcement element, may comprise a plurality of openings and/or recesses. The openings may comprise continuous edges, whereas the edges of the recesses transition into the two opposing side edges of the first reinforcement element. The openings and recesses are provided both to save weight and to allow handling underneath or distal to the first reinforcement element during bicycle frame assembly, for example, to pull one or more cables underneath the reinforcement element or between the reinforcement element and the adjacent tube wall.

For ease of fabrication, the openings may be configured as rectangular, honeycomb or rhombic, the rhombic openings comprising four rectilinear edges, the opposing edges being parallel and arcuate edges being disposed between two rectilinear edges. The recesses can be configured in a V-shape.

In order for the reinforcement device to comprise a high rigidity despite the openings and/or recesses, the openings and the recesses may be arranged offset from each other in the axial longitudinal direction of the first reinforcement element.

The first reinforcement element may comprise a base plate provided with the openings, which has adjacent transition regions extending at an angle of inclination inclined at a first angle to the base plate, which transition regions extend into edge portions which comprise a second angle of inclination which is less than the first angle of inclination. The first reinforcement element thus obtains a tub-like cross-section that defines a reception bed for an energy storage.

Several second reinforcement elements can be designed in the tube as axially spaced ridges arranged one behind the other. The stiffness of the reinforcement device can thus be increased in a structurally simple and cost-effective manner.

For the same reason, the several axially spaced ridges arranged one behind the other in the tube can define rows of ridges extending next to each other. The rows of ridges extending side by side may, for example, be arranged parallel to each other.

In a very basic embodiment, the reinforcement device may comprise a metal sheet having a plurality of holes.

In order to achieve a high stiffness, the reinforcement device may be made of a metal material. A carbon fiber reinforced plastic is recommended when, in addition to high stiffness, a low weight is required for the reinforcement device. A glass fiber reinforced plastic may be chosen where there is a lower requirement for sufficient stiffness.

A second aspect of the present invention is directed to a bicycle frame for an electric bicycle, comprising the reinforcement device in a down tube or in a saddle tube. The reinforcement device is connected to the adjacent tube wall along substantially its entire length, but is not necessarily connected to the tube wall continuously along its entire axial length. The reinforcement device can, for example, be connected to the tube wall in at least two axial and mutually parallel lines. The tube section in question is thereby reinforced, in particular also with respect to torsion.

The reinforcement device can, for example, be connected to the tube wall of the relevant bicycle frame tube in a substantially force-locking and/or form-locking manner, for example, via a plurality of punctual screw connections. The reinforcement device can also be additionally or supplementarily connected to the tube wall by a material bond, for example, by spot welding. The form-locking or frictional connection between the bicycle frame tube and the reinforcement device completely avoids or significantly reduces the effort required for the mechanical connection of the reinforcement device to the adjacent tube wall.

Two opposing sockets may be provided in the down tube or saddle tube. In the present case, "opposite" is to be understood to mean that the two sockets face each other, for example, mirror-symmetrically in relation to an axial vertical plane. The sockets can be configured in a web-like manner and project from the tube wall into the tube interior with a radial component.

The sockets or socket ribs may extend over part or all of the length of the relevant saddle tube or down tube. The two sockets additionally stiffen the down tube or saddle tube, and can, for example, receive the reinforcement device in a form-locking manner and/or serve as full material for holes or threaded holes into which corresponding bolts or threaded screws are inserted or screwed to fix the reinforcement device.

Holes and/or axially extending grooves can be machined into the sockets. The bores may be threaded so that bolts for fixing the reinforcement device in the down tube or the saddle tube can be screwed into the bores. The bores, which may be through-holes, can be sealed from the outside after the screwing-in process, for example, with a filler. Thread-cutting screws can be screwed into the grooves so that the separate production of an inner thread can be avoided.

Longitudinal holes can be provided in the down tube or the saddle tube in order to weld the reinforcement device to the down tube or the saddle tube, for example, from the outside.

The down tube or the saddle tube can be an extruded profile that can be used for all frame shapes.

Embodiments of the present inventions will be explained in greater detail below under reference to the accompanying drawings.

Figure 1:
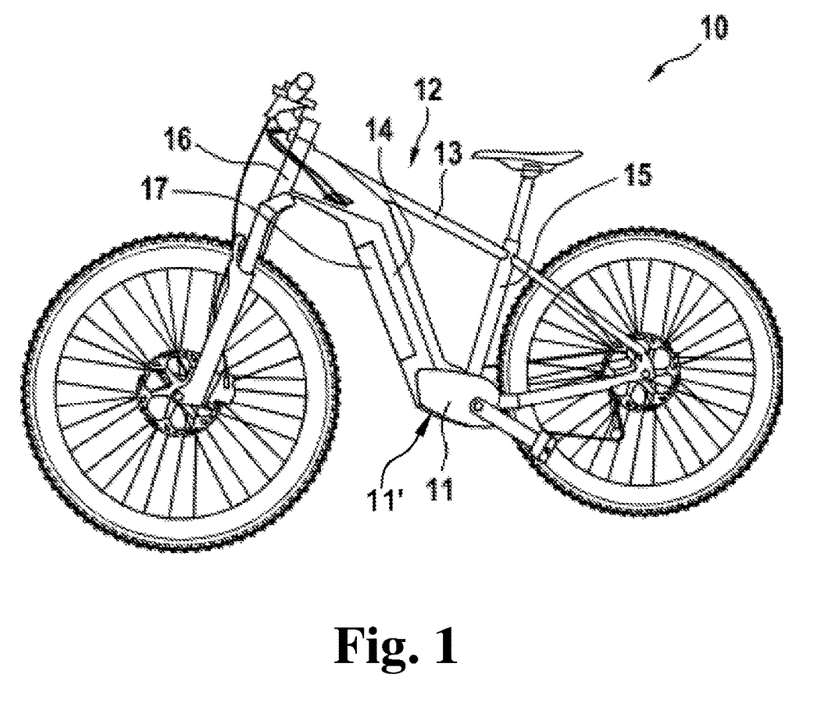
FIG. 1 shows a side view of an electric bicycle with a first embodiment of a bicycle frame.

FIG. 1 shows an electric bicycle 10 with an electric motor 11' mounted behind a cover 11. The electric bicycle 10 comprises a bicycle frame 12 with a top tube 13, a down tube 14, a saddle tube 15, and a head tube 16.

An electric energy storage 17 is arranged below the down tube 14 or is accessible from below in the down tube 14. The energy storage 17, which can, for example, be a rechargeable battery, supplies the electric motor 11' with electric energy during a riding operation.

The energy storage 17 is removably mounted in the bicycle frame 12. The energy storage 17 can therefore be removed from the bicycle frame 12 when necessary, for example, for recharging, for protection against theft, for maintenance purposes, or for replacement in the case of wear, and can later be reattached thereto.

Figure 2:
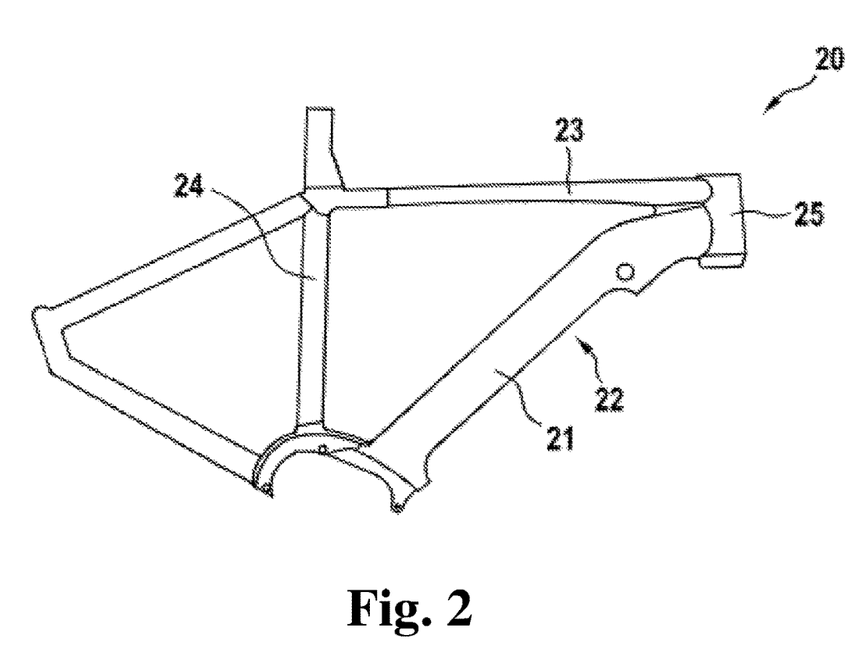
FIG. 2 shows a side view of a second embodiment of the bicycle frame.
Figure 3:
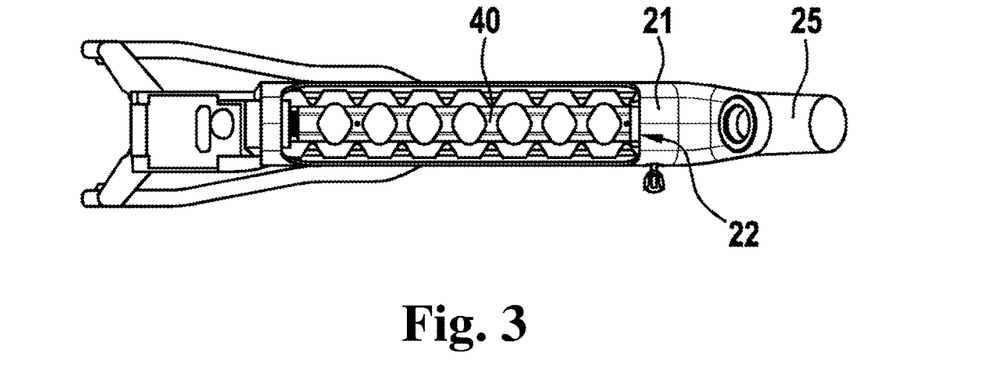
FIG. 3 shows a bottom view of the bicycle frame of FIG. 2 with a reinforcement device according to the present invention.

FIGS. 2 and 3 show a bicycle frame 20 with a down tube 21 in which a cut-out 22 is provided for receiving the electric energy storage device (which is here not shown in more detail). The bicycle frame 20 also comprises a top tube 23, a saddle tube 24, and a head tube 25. A reinforcement device 40 is mounted in the down tube 21 (see FIGS. 3 to 7).

The reinforcement device 40 comprises a first reinforcement element 41 extending axially in the down tube 21 and, at right angles thereto, two second reinforcement elements 42 and 43 also extending axially in the down tube 21. The first reinforcement element 41 is provided with several openings 44 and recesses 45 and 46. The openings 44 and the recesses 45 and 46 allow one or more cables to be pulled through underneath the reinforcement device 40. The openings 44 and the recesses 45 and 46 also serve to save weight.

Figure 4:
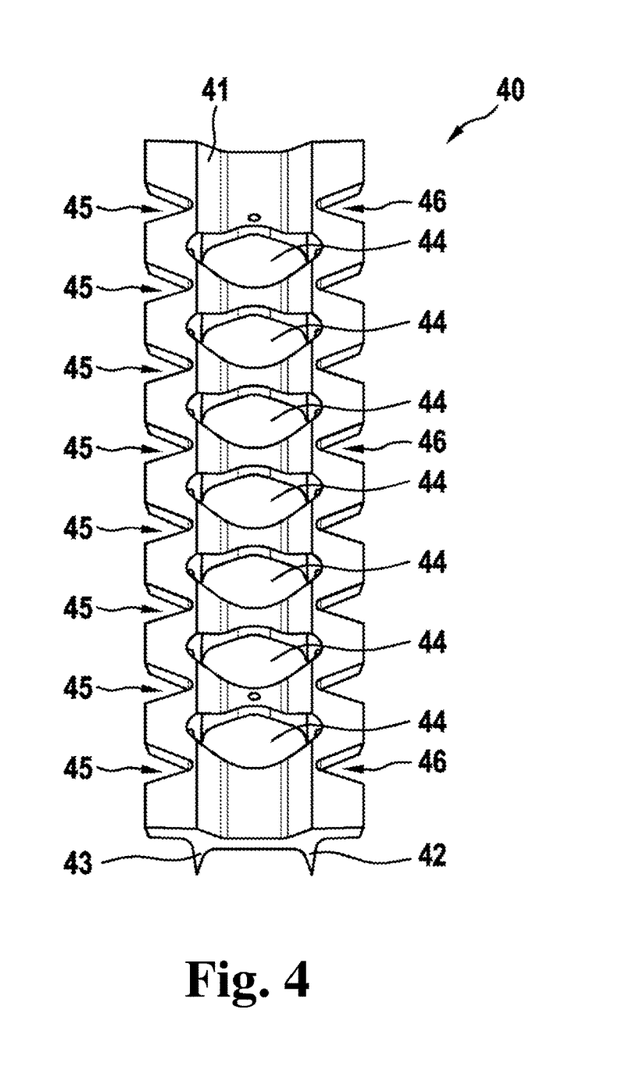
FIG. 4 shows a perspective front view of the reinforcement device of FIG. 3.
Figure 5:
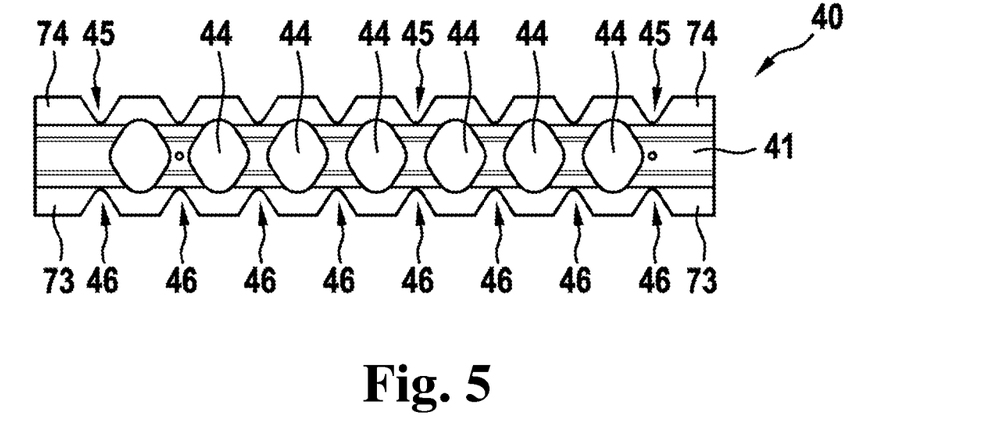
FIG. 5 shows a top view of the reinforcement device of FIGS. 3 and 4.

The openings 44 comprise circumferential edges that are closed. The openings 44 comprise four straight edges, the opposite edges being parallel to each other. Between two straight edges there are curved edges. The openings 44 thus comprise a rhombic shape.

The recesses 45 and 46 are V-shaped. Their edges extend into the two opposing side edges of the first reinforcement element 41 so that the recesses 45 and 46 discontinue the side edges.

The openings 44 and the recesses 45 and 46 are arranged offset from each other in the axial longitudinal direction of the reinforcement element 40 so that the highest possible rigidity is achieved.

Figure 7:
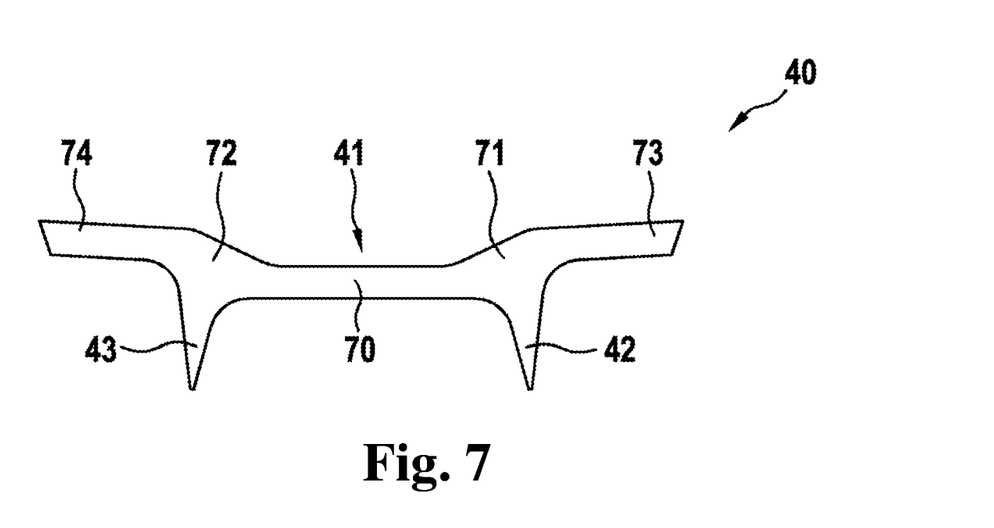
FIG. 7 shows a front view of the reinforcement device of FIGS. 3-6.

The first reinforcement element 41 comprises a base plate 70, which is bordered by inclined transition areas 71 and 72 having a first angle of inclination (see FIG. 7). The transition regions 71 and 72 transition into edge portions 73 and 74 which comprise a second angle of inclination which is less than the first angle of inclination. The first reinforcement element 41 consequently has a tub-like cross-section which defines a reception bed for the energy storage. The edge sections 73 and 74 are followed by further edge sections which are not provided with further reference signs for reasons of clarity (see FIG. 5).

Figure 6:
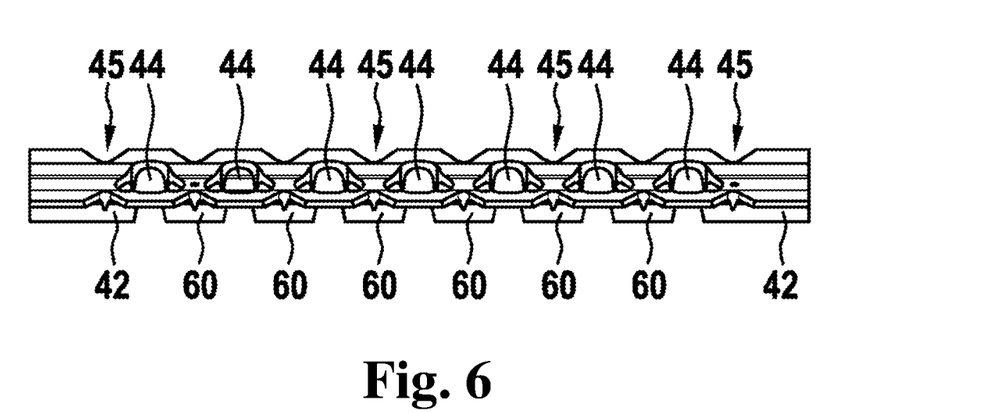
FIG. 6 shows a perspective side view of the reinforcement device of FIGS. 3-5.

Two second reinforcement elements 42 and further second reinforcement elements 60 are respectively configured as ridges, which are arranged axially spaced one behind the other (see FIG. 6). The second reinforcement elements 42 and 60 are located below the recesses 46, so that the second reinforcement elements 42 and 60 increase the stiffness of the reinforcement device 40 (see FIGS. 5 and 6). The second reinforcement elements 42 and 60 define a first row of ridges. On the opposite side, not visible here, there are also several axially spaced second reinforcement elements arranged one behind the other, which are placed below the recesses 45 and thus define a second row of ridges extending parallel to the first row of ridges.

Figure 8:
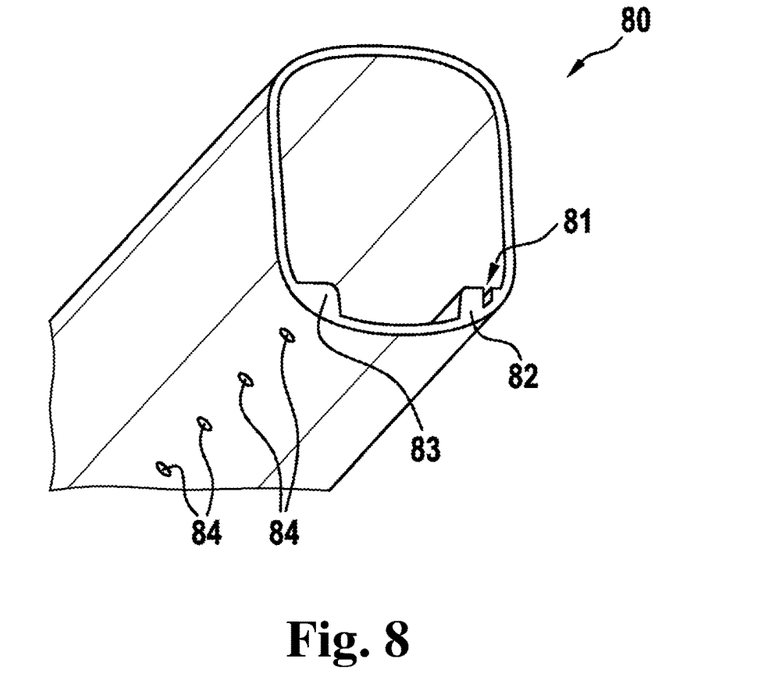
FIG. 8 shows a perspective front view or a cross-section of a first embodiment of a tube of the bicycle frame of FIGS. 1-3.

FIG. 8 shows a tube 80 which can, for example, be a down tube or a saddle tube, and which is provided for receiving the reinforcement device 40.

A first socket 82 comprising an axially extending groove 81 is arranged in the tube 80. Mirror-symmetrically located opposite thereto is provided a second socket 83 in which threaded holes 84 are provided. The reinforcement device 40 can be placed on the sockets 82 and 83 during assembly. The reinforcement device 40 can be screwed to the tube 80. For this purpose, thread-cutting screws can be screwed into the groove 81. The bores 84 can respectively comprise an internal thread into which screws can be screwed for fixing the reinforcement device 40 to the tube 80. In FIG. 8, the different sockets 82 and 83 in the tube 80 serve to illustrate the two screw connection alternatives. The tube 80 typically comprises two sockets 82 with the groove 81 or two second sockets 83 with the threaded bores 84.

Figure 9:
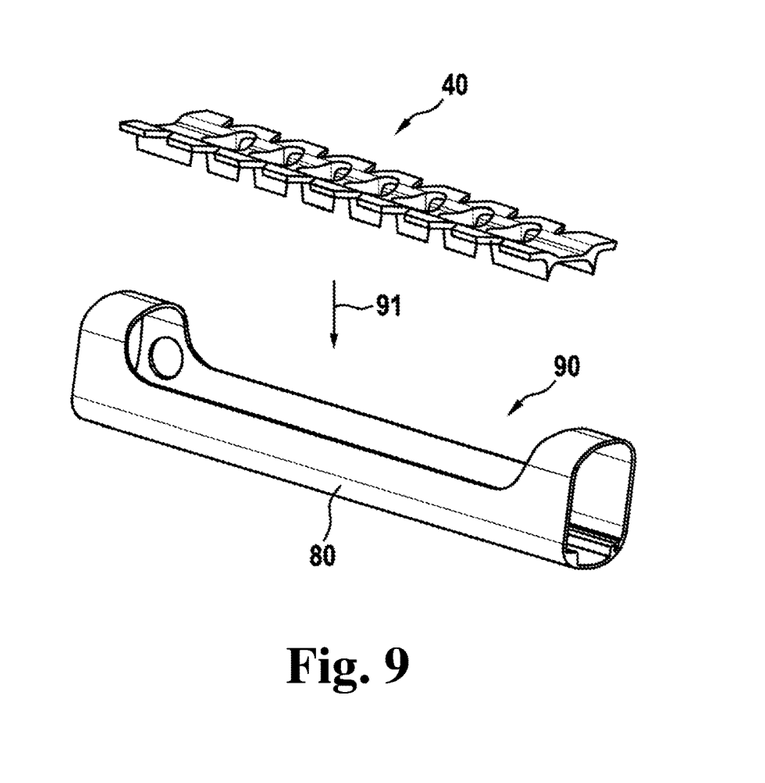
FIG. 9 shows a perspective view of the cut-out first embodiment of the tube of FIG. 8 and the reinforcement device prior to assembly.

Before inserting the reinforcement device 40 into the tube 80, the tube 80 is provided with a cut-out 90. The reinforcement device 40 is then inserted into the tube 80 in the direction of an arrow 91 (see FIG. 9). The reinforcement device 40 is screwed to the tube 80 if the reinforcement device 40 is made of a carbon fiber reinforced or glass fiber reinforced plastic. It is, however, also possible if the reinforcement device 40 is made of a metal material.

Figure 10:
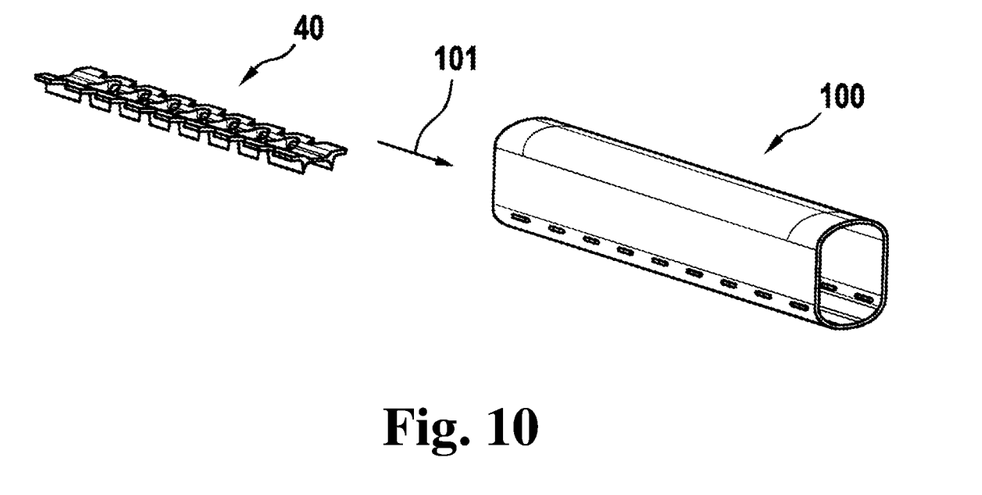
FIG. 10 shows a perspective view of a second embodiment of a tube of the bicycle frame of FIGS. 1-3 and the reinforcement device prior to assembly.
Figure 11:
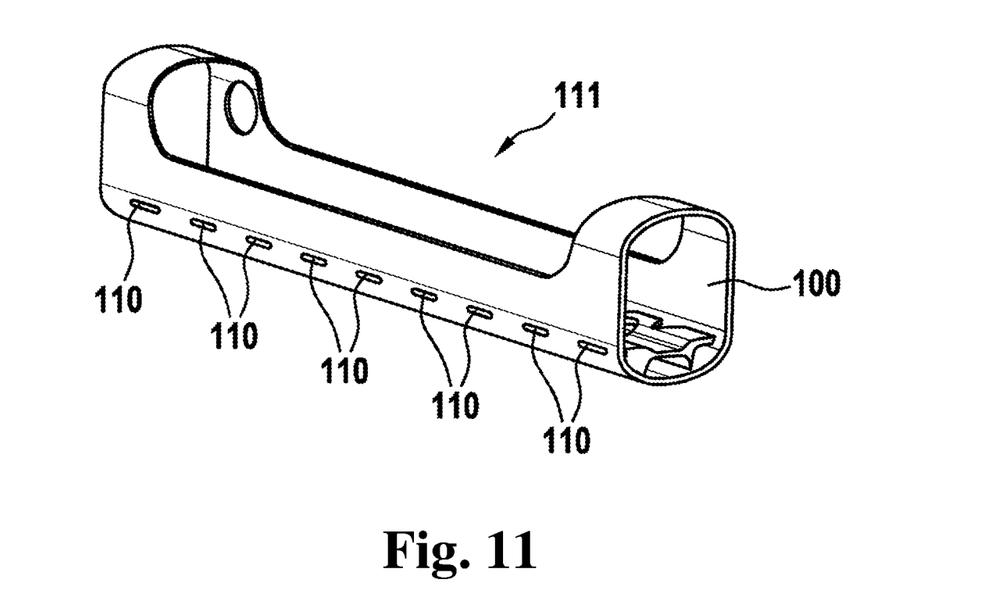
FIG. 11 shows a perspective view of the tube and reinforcement device of FIG. 10 after assembly.

If the reinforcement device 40 is made of the metal material, it can be welded to a tube 100 as an alternative to screwing (see FIGS. 10 and 11). Longitudinal holes 110 are provided for this purpose in the tube 100 through which the edge portions 73 and 74 and the remaining edge portions can be welded to the tube 100. Before welding, the reinforcement device 40 can be inserted axially into the tube 100 in the direction of an arrow 101 (see FIG. 10) and then welded to the tube 100 from the outside. To prevent the tube 100 from being distorted during welding, the tube 100 is not provided with a cut-out 111 until after the welding process. As an alternative to this manufacturing sequence, however, the tube 100 may first be provided with the cut-out 111, then inserted into the tube 100, and subsequently welded to the tube 100 from the inside or from the outside.

After the reinforcement device 40 has been welded to the tube 100, the tube 100, which is an extruded profile, is welded into the bicycle frame.

The present invention is not limited to embodiments described herein; reference should be had to the appended claims.

LIST OF REFERENCE NUMERALS

10 Electric bicycle
11 Cover
11' Electric motor
12 Bicycle frame
13 Top tube
14 Down tube
15 Saddle tube
16 Head tube
17 Energy storage
20 Bicycle frame
21 Down tube
22 Cutout
23 Top tube
24 Saddle tube
25 Head tube
40 Reinforcement device
41 First reinforcement element
42 Second reinforcement element
43 Second reinforcement element
44 Opening
45 Recess
46 Recess
60 Second reinforcement element
70 Base plate
71 Transition area
72 Transition area
73 Edge section
74 Edge section
80 Tube
81 Groove
82 First socket
83 Second socket
84 Threaded bore
90 Cut-out
91 Arrow
100 Tube
101 Arrow
110 Longitudinal hole
111 Cut-out

The invention claimed is:

1. A bicycle frame for an electric bicycle, the bicycle frame comprising:
   a down tube;
   a saddle tube; and
   a reinforcement device for reinforcing the bicycle frame at least in a region of a tube cutout of a bicycle frame tube which is configured to accommodate an energy storage, the reinforcement device comprising:

a first reinforcement element which is configured to at least one of extend axially in the bicycle frame tube and to extend at a certain angle to the bicycle frame tube; and at least one second reinforcement element which is configured to extend axially in the bicycle frame tube, wherein, the reinforcement device is configured to be installed in the down tube or in the saddle tube as the bicycle frame tube, the down tube comprises a first socket and a second socket which is arranged to oppose the first socket, or the saddle tube comprises a first socket and a second socket which is arranged to oppose the first socket, and the reinforcement device is connected to a tube wall of the bicycle frame tube along substantially an entire length of the reinforcement device in at least two axial and mutually parallel lines via the first socket and the second socket.

2. The bicycle frame as recited in claim 1, wherein the first reinforcement element comprises at least one of a plurality of openings and a plurality of recesses.

3. The bicycle frame as recited in claim 2, wherein, the plurality of openings are configured in a rectangular shape, a honeycomb shape or a rhombic shape, and the plurality of openings define four rectilinear edges with arcuate edges being provided between two respective neighboring rectilinear edges of the four rectilinear edges.

4. The bicycle frame as recited in claim 2, wherein the plurality of openings and the plurality of recesses are arranged offset from each other in a longitudinal direction of the first reinforcement element.

5. The bicycle frame as recited in claim 2, wherein the first reinforcement element further comprises, a base plate which comprises the plurality of openings arranged therein, transition regions which are arranged adjacent to the base plate and which extend inclined with respect to the base plate at a first angle of inclination, and edge sections, wherein, a respective one of the edge sections extends into a respective one of the transition regions, and the edge sections extend inclined with respect to the base plate at a second angle of inclination which is smaller than the first angle of inclination.

6. The bicycle frame as recited in claim 5, wherein the base plate further comprises a plurality of the at least one second reinforcement element which are configured as a plurality of ridges arranged axially spaced one behind the other in the bicycle frame tube.

7. The bicycle frame as recited in claim 6, wherein the plurality of ridges arranged axially spaced one behind the other in the bicycle frame tube define rows of ridges which extend side by side.

8. The bicycle frame as recited in claim 1, wherein, bores are arranged in the first socket and in the second socket, or an axially extending groove is arranged in the first socket and in the second socket, or bores are arranged in the first socket and an axially extending groove is arranged in the second socket, or bores are arranged in the second socket and an axially extending groove is arranged in the first socket.

9. The bicycle frame as recited in claim 8, wherein, the down tube comprises least one of longitudinal holes, holes, and axially extending grooves arranged in the down tube, or the saddle tube comprises at least one of longitudinal holes, holes, and axially extending grooves arranged in the saddle tube.

10. The bicycle frame as recited in claim 9, wherein the bores are threaded so that bolts for fixing the reinforcement device in the down tube or in the saddle tube can be screwed, via the at least one of the longitudinal holes, the holes, and the axially extending grooves, into the bores.

* * * * *